United States Patent [19]
Cerny

[11] Patent Number: 5,635,624
[45] Date of Patent: Jun. 3, 1997

[54] APPARATUS FOR CARRYING OUT A CRASH TEST ON A MOTOR VEHICLE

[75] Inventor: Walter Cerny, Cologne, Germany

[73] Assignee: Ford Motor Company, Dearborn, Mich.

[21] Appl. No.: 688,134

[22] Filed: Jul. 29, 1996

[30] Foreign Application Priority Data

Aug. 14, 1995 [DE] Germany ............... 195 29 801.2

[51] Int. Cl.⁶ .................................................. G02M 7/00
[52] U.S. Cl. ....................... 73/12.01; 73/12.04; 73/865.3
[58] Field of Search ........................ 73/12.01, 12.04, 73/865.3, 865.6; 280/735, 749; 180/282

[56] References Cited

U.S. PATENT DOCUMENTS

| | | | |
|---|---|---|---|
| 3,430,481 | 3/1969 | Shinbaum et al. | 73/12.04 |
| 3,512,498 | 5/1970 | Luebke | 73/12.01 X |
| 3,757,562 | 9/1973 | Goldberg et al. | 73/12.04 |
| 3,939,691 | 2/1976 | Stanev et al. | 73/12.01 |
| 4,524,603 | 6/1985 | Hargunani et al. | 73/12.01 |
| 5,185,701 | 2/1993 | Blackburn et al. | 73/12.01 X |
| 5,338,206 | 8/1994 | Hupfer | 73/865.3 X |
| 5,483,845 | 1/1996 | Stein et al. | 73/12.01 X |
| 5,485,758 | 1/1996 | Brown et al. | 73/12.04 X |

*Primary Examiner*—Elizabeth L. Dougherty
*Attorney, Agent, or Firm*—Daniel M. Stock

[57] ABSTRACT

An apparatus for carrying out a crash test on a motor vehicle is described, in which the vehicle is accelerated on a track by means of a driving arrangement before it strikes an obstacle. A data recording unit associated with the vehicle and serving to record the measuring data of the crash test is not mounted on the vehicle itself, but on a follower vehicle guided behind the vehicle. This follower vehicle has associated with it a braking mechanism, which brings about braking of it before the vehicle crashes against the obstacle. A measuring cable connection is provided between the vehicle and the follower vehicle, which has a length at least great enough to cover the distance between the vehicle in the crashed condition and the follower vehicle in the braked condition. Preferably, a cable storage device for the measuring cable is provided on the follower vehicle, from which the measuring cable is hung in meander-like loops and is automatically released on braking of the follower vehicle.

9 Claims, 3 Drawing Sheets

APPARATUS FOR CARRYING OUT A CRASH TEST ON A MOTOR VEHICLE

BACKGROUND OF THE INVENTION

1. Field of the Invention

The invention relates to an apparatus for carrying out a crash test on a motor vehicle in which the vehicle is accelerated on a track by means of a driving device before it strikes an obstacle, and a data recording unit is associated with the vehicle.

2. Discussion of Related Art

In crash tests, measurements are performed of the behaviour of a vehicle in an intentional collision with an obstacle. The measurement data are picked up by data sensors and fed to a data recording unit. It is known to carry the data recording unit in the crash vehicle itself. The installation of the data recording unit in the vehicle requires a considerable expenditure of time. For crash testing vehicles of different types, different means of fastening the data recording unit are required. A further disadvantage is that the test results are affected by the mass of the data recording unit and of the necessary fastening devices. Moreover, as a result of the installation of the data recording unit in the crash vehicle, the center of gravity of the crash vehicle is shifted, thereby changing the result of a crash test compared with a crash vehicle having no data recording unit.

It often happens that as a result of the presence of the data recording unit, it is not possible to keep to the test weight and the prescribed axle loadings. One then attempts, by removing parts of the vehicle that are not relevant to the crash, to bring about a reduction of the test weight and a displacement of the axle load distribution, but this involves a considerable amount of work. A further disadvantage of mounting the data recording unit in the crash vehicle is that the data recording unit is not available for use until disassembly from the crash vehicle, so that the timetabling and planning the nature of crash tests is made inflexible. If the data recording unit is connected to stationary terminals via towing cables, this can also affect the crash vehicle with respect to the collision speed and a shift in the point of impact.

SUMMARY OF THE INVENTION

The object of the invention is essentially to improve an apparatus of the kind referred to above so as to minimize effects on the results of measurement by the data recording unit.

To this end, according to the invention, the data recording unit is carried on a follower vehicle guided on the track behind the vehicle and driven by the driving arrangement. The follower vehicle has associated with it a braking mechanism which brings about braking of it before the impact of the vehicle with the obstacle, and a measuring cable connection is provided between the vehicle and the follower vehicle which has a length at least great enough to cover the distance between the vehicle in the crashed condition and the follower vehicle in the braked condition.

This has the advantage that the data recording unit does not have to be installed in the crash vehicle, and therefore is immediately available for further crash tests when a crash test has been completed. The time needed for the installation of the data recording unit is saved, and the data recording unit can be available centrally for crash tests, so that the provision of a plurality of data recording units is unnecessary. Also, different fittings for mounting the data recording unit in crash vehicles of different types are not required. No problems occur with regard to keeping to the test weight and the prescribed axle loadings of the crash vehicle, and there are no adverse effects on the test results due to the mass of the data recording unit. Moreover, as a result of the installation of the data recording unit on the follower vehicle, the center of gravity of the crash vehicle is not displaced. Since the data recording unit is available centrally for crash testing, crash tests can be arranged at short notice, which leads to great flexibility in arranging the nature and time of the tests. Deviations in the impact speed and in the point of impact of the crash vehicle due to towing cables do not occur.

In an advantageous embodiment of the invention, a cable storage device can be included in the measuring cable connection between the crash vehicle and the data recording unit, from which measuring cable can be paid out in the event of relative movement between the vehicle and the follower vehicle. In a particularly advantageous embodiment, the cable storage device has a guide rail device mounted on the follower vehicle and extending longitudinally of it and having an open end on the side facing the vehicle on which the measuring cable or cables is or are held on guide elements which are fixed to the measuring cable or cables at corresponding distances apart, are embraced in the guide rail device, and are easily movable therein. The guide elements preferably have guide rollers. The follower vehicle, which is first of all accelerated at the same speed as the crash vehicle, is braked well enough before the impact of the crash vehicle with the obstacle that the follower vehicle comes to a standstill a sufficient distance behind the crash vehicle. The meander-like loops of the measuring cable are automatically thrown off by the deceleration of the follower vehicle, since the guide elements carried readily movably in the guide rail device fall out of the open-ended guide rail device as a result of their inertia. The crash vehicle continues on its way unaffected by this until it strikes the obstacle, while the measuring cable connection between the crash vehicle and the data recording unit carried on the follower vehicle is maintained.

In an advantageous embodiment of the invention, a chock device may also be provided in order to actuate the braking mechanism of the follower vehicle. The way in which the arrangement operates is that an effect on a braking mechanism associated with the follower vehicle is produced as soon as a corresponding mechanical part of the follower vehicle comes into contact with a stationary, but preferably adjustable, chock.

BRIEF DESCRIPTION OF THE DRAWINGS

An embodiment of the invention will now be described in more detail by way of example with reference to the drawings, in which.

DESCRIPTION OF PREFERRED EMBODIMENTS

Figure 3:
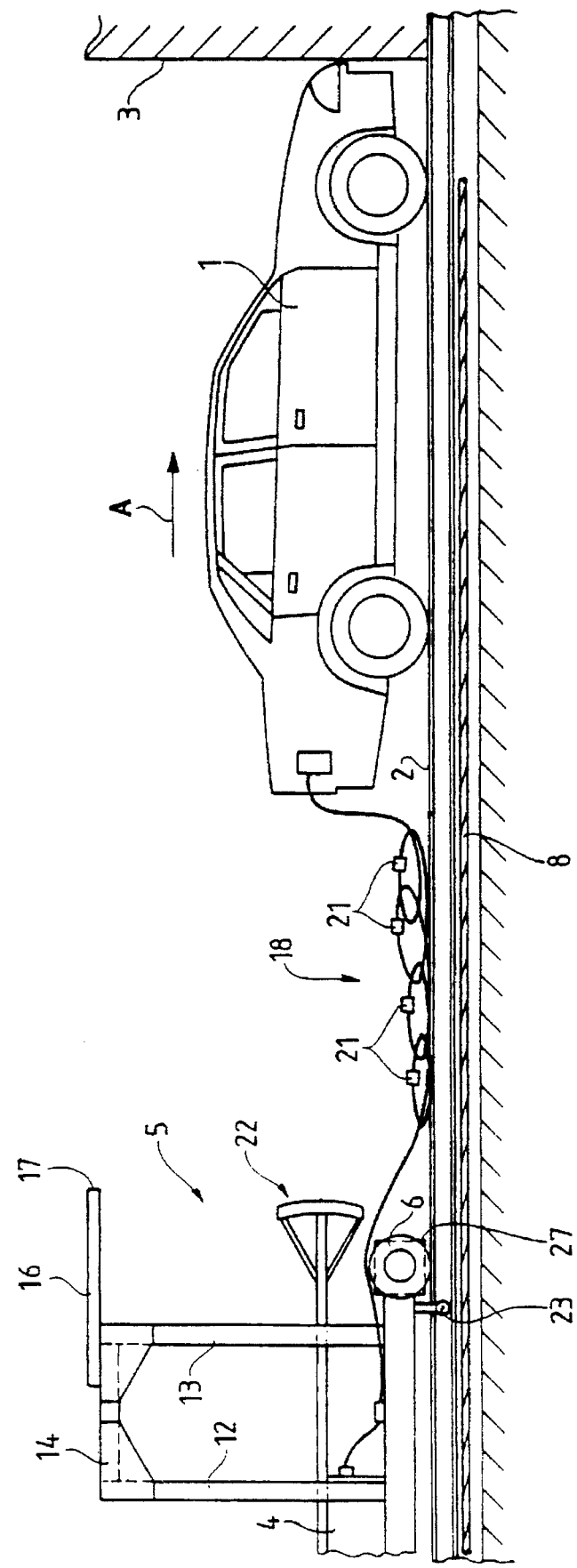
FIG. 3 shows the apparatus of FIG. 1 with the vehicle shown shortly before the impact with the obstacle, while the follower vehicle has come to a standstill and the measuring cable connection has been automatically paid out through the deceleration of the follower vehicle.

To perform a crash test, a vehicle 1 is accelerated on a track in the direction of the arrow A until the vehicle strikes an obstacle 3 (FIG. 3). The vehicle 1 has data sensors (not shown) which supply measuring data to a data recording unit 4 during the impact. The data recording unit 4 is located on a follower vehicle 5, which is guided on the track 2 by means of front and back running wheels 6 and 7.

A towing cable 8, movable (by means which are not shown) in the direction of the arrow B, runs in a recess extending longitudinally of the track 2. The towing cable serves to drive both the vehicle 1 and the follower vehicle 5. For this purpose, a connecting element 9 is provided on the vehicle 1, by means of which the vehicle 1 can be connected to the towing cable 8. When the towing cable 8 is moved in the direction of the arrow B, the vehicle also moves simultaneously in the direction of the arrow A. A corresponding connecting device 10 is provided, by means of which the follower vehicle can be connected to the towing cable 8. When the connection is made, the follower vehicle 5 moves behind the vehicle 1 on the track 2.

Figure 1:
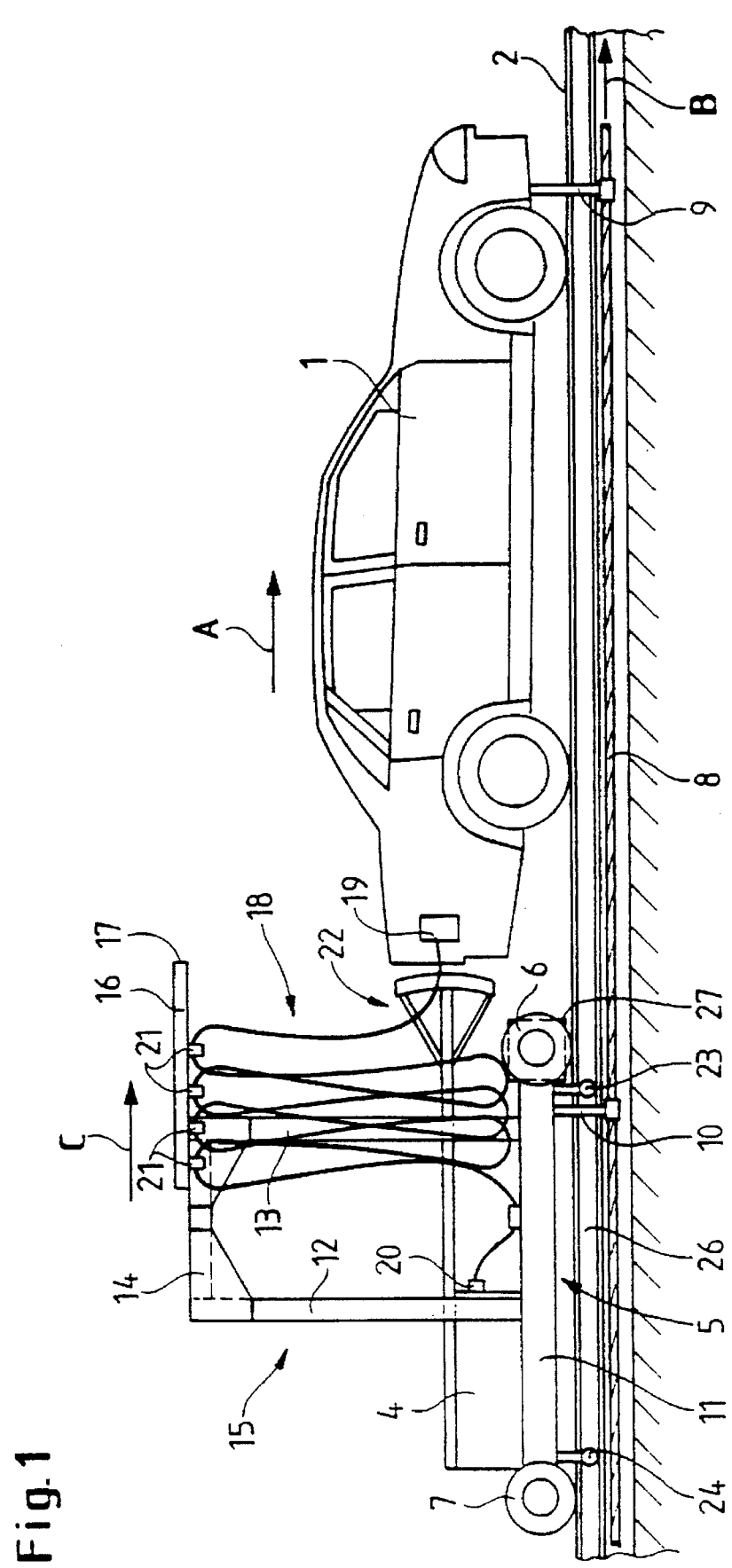
FIG. 1 is a diagrammatic side view of the apparatus with a vehicle to be crashed and a follower vehicle located behind it in the direction of travel, shortly before the test begins.

The follower vehicle 5 has a chassis 11 on which the data recording unit 4 is mounted. In addition, on a frame arrangement 15 having vertical portions 12, 13 and horizontal portions 14, a guide rail device 16 is provided which is open at its end 17 facing the vehicle 1. Between the vehicle 1 and the data recording unit 4, a measuring cable connection 18 is provided, which is connected at 19 to the vehicle 1 and at 20 to the data recording unit 4. At the beginning of the crash process, the measuring cable is, as can be seen from FIG. 1, guided in meander-like loops, with the top of each loop carrying on the outside of the measuring cable guide elements 21, such as hooks, which engage by means of guide rollers (not shown) in downwardly open slits in the guide rail device 16 (rather like the way a curtain is hung from guide rollers fitted in a curtain rail). As illustrated in FIG. 1, the guide rail device 16 is open at its end 17, so that the measuring cable with the guide elements 21 can be introduced by an operator into the guide rail device 21 from the right-hand end. The number of the meander-like loops or the length of the measuring cable connection is selected so that in any case it covers the distance between the vehicle 1 in the position in which it has struck the obstacle 3 and the previously braked follower vehicle 5.

For shunting purposes, the follower vehicle 5 is also provided with a framework 22. In addition, the follower vehicle is guided by means of front and rear guide roller devices 23, 24 in a guide rail 26 extending longitudinally of the track. The follower vehicle 5 also has a braking mechanism, shown diagrammatically and indicated by 27.

Figure 2:
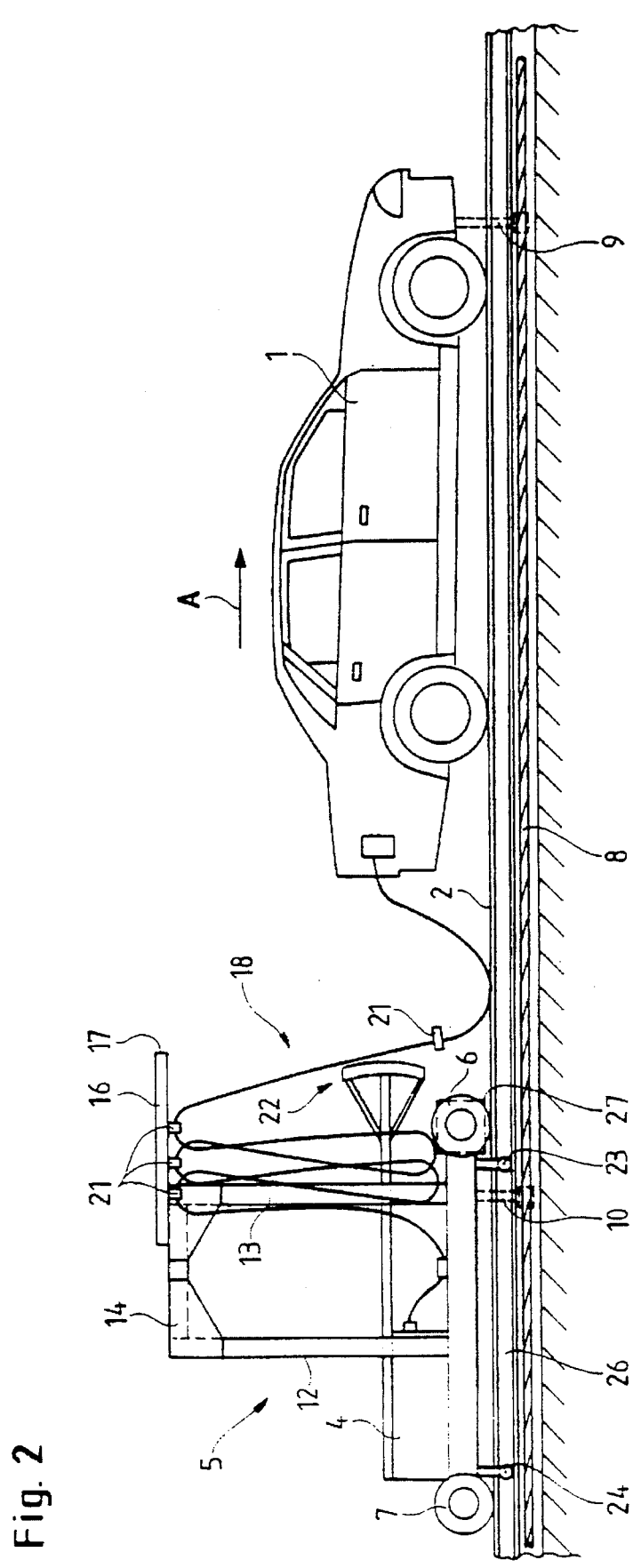
FIG. 2 shows an apparatus according to FIG. 1 shortly after the beginning of the braking process for the follower vehicle, while the vehicle is moving towards the obstacle.

The apparatus works in the following manner. Starting from the position in FIG. 1, both the vehicle 1 and the follower vehicle 5 are accelerated in the direction of impact A by means of the towing cable 8 moved in the direction of the arrow B and the connections 9 and 10. After reaching a predetermined position, the connection 10 between the towing cable 8 and the follower vehicle 5 is released and the follower vehicle 5 is braked, while the vehicle 1 moves on in the direction of the arrow A (FIG. 2). The actuation of the braking mechanism 27 of the follower vehicle is effected by a chock device (not shown). As can be seen from FIG. 2, during the braking of the follower vehicle 5, the guide elements 21 slide in the direction C owing to their inertia until they leave from the open end 17 of the guide rail device and are thus thrown off. FIG. 3 shows the situation with the follower vehicle 5 braked and the vehicle 1 moving in the direction of the arrow A shortly before the collision with the obstacle 3. As can be seen in this phase, all the guide elements 21 have come out of the front end 17, so that the measuring cable has automatically been thrown out. In this way, the measuring cable connection 18 between the vehicle 1 and the data recording unit 4 is maintained even after the braking of the follower vehicle 5, whereby the measuring data obtained during the immediately following collision or crash can be received by the data recording unit 4 without the measuring results being affected by the data recording unit.

I claim:

1. An apparatus for carrying out a crash test on a motor vehicle, in which the vehicle is accelerated on a track by means of a driving arrangement to strike an obstacle, the apparatus comprising:

a data recording unit a follower vehicle guided on the track behind the vehicle, driven by the driving device and having said data recording unit carried thereon, said follower vehicle having a braking mechanism operative to stop said follower vehicle before the motor vehicle strikes the obstacle; and wherein a measuring connecting cable is provided between the motor vehicle and the follower vehicle, said cable having a length at least great enough to open the distance between the vehicle in the crashed condition and the follower vehicle in the stopped condition.

2. Apparatus according to claim 1, wherein the measuring cable connection has associated with it a cable storage device from which measuring cable is released upon relative movement between the vehicle and the follower vehicle.

3. Apparatus according to claim 2, wherein said cable storage device comprises a guide rail device mounted on the follower vehicle and extending longitudinally thereof and having an open end at the side facing the motor vehicle, on which at least one measuring cable is held as a meander loop on guide elements, said guide elements being fixed to said measuring cable in spaced apart relationship, being movably received by said guide rail device.

4. Apparatus according to claim 3, wherein said guide elements comprise guide rollers.

5. An apparatus for carrying out a crash test on a motor vehicle comprising:

at least one data sensor mounted on the motor vehicle;

a track having an obstacle positioned proximate an end thereof and adapted to permit longitudinal movement of the motor vehicle therealong;

a follower vehicle carried longitudinally rearward of the motor vehicle for movement along said track;

a data recording unit carried with said follower vehicle;

a driving arrangement drivingly engaging both the motor vehicle and said follower vehicle to effect accelerating movement of the motor vehicle and said follower vehicle toward said obstacle;

brake means operative to stop movement of said follower vehicle at a position longitudinally rearwardly spaced from the motor vehicle when the motor vehicle engages said obstacle; and at least one measuring connecting cable having one end connected to said at least one data sensor and another end operatively connected to said data recording unit.

6. Apparatus according to claim 5 wherein said at least one measuring connecting cable defines a length greater than the distance that said data recording unit is spaced from said at least on data sensor when the motor vehicle has contacted sdaid obstacle and said follower vehicle has stopped longitudinally rearwardly spaced therefrom.

7. Apparatus according to claim 5, wherein the measuring connecting cable includes a cable storage device from which measuring cable is released upon relative movement between the vehicle and the follower vehicle and braking of said follower vehicle.

8. Apparatus according to claim 7, wherein said cable storage device comprises a guide rail device mounted on said follower vehicle and extending longitudinally thereof and having an open end at the side facing the motor vehicle, on which said at least one measuring cable is held as a meander loop on guide elements, said guide elements being fixed to said measuring cable in spaced apart relationship, being movably received by said guide rail device.

9. Apparatus according to claim 8, wherein said guide elements comprise guide rollers.

* * * * *